United States Patent [19]

Albin

[11] Patent Number: 4,564,662

[45] Date of Patent: Jan. 14, 1986

[54] FLUOROCARBON ELASTOMER

[75] Inventor: Loren D. Albin, Oakdale, Minn.

[73] Assignee: Minnesota Mining and Manufacturing Company, St. Paul, Minn.

[21] Appl. No.: 582,926

[22] Filed: Feb. 23, 1984

[51] Int. Cl.$^4$ ............................................. C08F 16/24
[52] U.S. Cl. .................................. 526/247; 526/248; 526/249; 526/251; 526/252; 525/326.2; 525/326.3
[58] Field of Search ............... 526/247, 248, 249, 252, 526/251

[56] References Cited

U.S. PATENT DOCUMENTS

| | | | |
|---|---|---|---|
| 2,968,649 | 1/1961 | Pallthorp | 260/80.5 |
| 3,051,677 | 8/1962 | Rexford | 260/29.6 |
| 3,306,879 | 2/1967 | Pattison | 260/77.5 |
| 3,318,854 | 5/1967 | Honn et al. | 260/87.7 |
| 3,351,619 | 11/1967 | Warnell | 260/80.76 |
| 3,666,864 | 5/1972 | Terrell | 424/342 |
| 4,035,565 | 7/1977 | Apotheker et al. | 526/247 |
| 4,243,770 | 1/1981 | Tatemoto et al. | 525/331 |
| 4,251,399 | 2/1981 | Tomoda et al. | 260/4 R |
| 4,260,698 | 4/1981 | Tatemoto et al. | 525/102 |
| 4,263,414 | 4/1981 | West | 525/102 |
| 4,277,586 | 7/1981 | Ukihashi et al. | 526/93 |
| 4,450,263 | 5/1984 | West | 526/249 |

FOREIGN PATENT DOCUMENTS 0079555 5/1983 European Pat. Off. .

OTHER PUBLICATIONS

Spears, L.; Szur, A. J.; and Terell, R. C.; *Jour. of Medicinal Chemistry*, 15, pp. 606–608 (1972).
Demiel, A., *J. of Organic Chemistry*, 25, pp. 993–996 (1960).
Park, J. D.; Cummings, H. L.; and Locher, J. R.; *J. of Organic Chemistry*, 23, pp. 1785–1786 (1958).
Corley, R. S.; Lal, J.; and Kane, M. W.; *J. of American Chem. Soc.*, 78, pp. 3489–3493 (1956).
Wheaton, G. A. and Burton, D. J., *J. of Organic Chemistry*, 48, pp. 917–927 (1983).
West, A. C. and Holcomb, A. G., "Fluorinated Elastomers", Kirk–Othmer, "Encyclopedia of Chemical Technology", vol. 8, 3rd Ed., John Wiley & Sons, Inc., pp. 500–515 (1979).
Albin, L. D.; Kosmala, J. L.; and Stoskopf, A. H.; "Rubber & Plastic News", pp. 28–30, Nov. 9, 1981.
Apotheker, D.; Finlay, J. B.; Krusic, P. J.; and Logothetis, A. L.; "Rubber Chemistry & Technology", 55, pp. 1004–1018 (1982).

*Primary Examiner*—Paul R. Michl
*Assistant Examiner*—J. M. Reddick
*Attorney, Agent, or Firm*—Donald M. Sell; James A. Smith; William G. Ewert

[57] ABSTRACT

Peroxide-curable fluorocarbon elastomers having interpolymerized units derived from a cure site monomer containing bromine or iodine. The fluorocarbon elastomer gums are prepared by copolymerizing with the principal monomers normally used in preparing fluorocarbon elastomers, e.g. vinylidene fluoride, hexafluoropropene, and (optionally) tetrafluoroethylene, a small amount of a novel cure site monomer which is a vinyl ether in which at least one of the two vinylic (or double-bonded) carbon atoms thereof is bonded to at least one bromine or iodine atom, e.g. $CF_3CH_2OCF=CFBr$. The cured fluorocarbon elastomers of this invention have useful properties normally associated with fluorocarbon elastomers, such as acid resistance, thermal stability, and high tensile strength. These properties of shaped articles made from these fluorocarbon elastomers are not adversely affected upon exposure to high temperatures for extended periods.

17 Claims, No Drawings

FLUOROCARBON ELASTOMER

This invention relates to fluorocarbon elastomrs and their preparation and use. In another aspect, it relates to peroxide-curable fluorocarbon elastomers having interpolymerized units derived from a cure site monomer containing bromine or iodine, and to the preparation of such fluorocarbon elastomers.

Fluorocarbon elastomers are premium materials for demanding service applications in harsh environments where extremes in temperature and aggressive chemicals are encountered, namely, applications in the automotive, petroleum, and energy-related industries. It is their generally high temperature stability, low compression set, and chemical and fluid resistance which enables fluorocarbon elastomers to have a variety of uses, such as seals, gaskets, and linings, in these areas; see West, A. C. and Holcomb, A. G., "Fluorinated Elastomers", Kirk-Othmer, "Encyclopedia of Chemical Technology", Vol. 8, 3rd Ed., John Wiley & Sons, Inc., pp. 500-515 (1979).

The commercial fluorocarbon elastomers are principally those made by polymerizing vinylidene fluoride with one or two other terminally unsaturated fluorine-containing comonomers, such as hexafluoropropene, 1-hydropentafluoropropene, chlorotrifluoroethylene, perfluoro(methyl vinyl ether), and tetrafluoroethylene. Another commercial type is the copolymer of tetrafluoroethylene with propylene or perfluoro(methyl vinyl ether).

The cure systems for converting the fluorocarbon elastomer gums into insoluble elastomers are basically of three types: diamine, dihydroxyaromatic, and free radical or peroxide systems. They have their relative merits, though the dihydroxyaromatic cure system is most widely used and recently the enhanced peroxide curing of fluorocarbon elastomers made with cure site monomers containing bromine or iodine has received increasing commercial attention; see Albin, L. D., Kosmala, J. L., and Stoskopf, A. H., "Rubber & Plastic News," pp. 28-30, Nov. 9, 1981, and Apotheker, D., Finlay, J. B., Krusic, P. J., and Logothetis, A. L., "Rubber Chemistry and Technology," 55 pp. 1004-18 (1982).

Prior art disclosures of fluoropolymers made with bromine- or iodine-containing materials include U.S. Pat. No. 3,351,619 (Warnell) which discloses use of a vinyl ether containing a fluoroalkyl iodide group; U.S. Pat. No. 3,306,879 (Pattison) which discloses the use of such compounds as 2-bromoethyl vinyl ether and 2-iodoethyl vinyl ether; U.S. Pat. Nos. 4,035,565 (Apotheker et al) and 4,263,414 (West) which disclose the use of bromine-containing olefins, such as bromotrifluoroethylene, 1-bromo-2,2-difluoroethylene, and vinyl bromide; U.S. Pat. Nos. 4,251,399 (Tomoda et al), 4,243,770 (Tatemoto et al), and 4,260,698 (Tatemoto et al) which disclose the use of iodinated compounds such as $I(CF_2CF_2)_2I$; and European Patent Application No. 0 079 555 (Kojima et al) published May 25, 1983, which discloses the use of perfluoro(2-bromoethyl vinyl ether).

Briefly, in one aspect of this invention, fluorocarbon elastomer gums are prepared by copolymerizing with the principal monomers normally used in preparing fluorocarbon elastomers, e.g. vinylidene fluoride, hexafluoropropene, and (optionally) tetrafluoroethylene, a small amount of a novel cure site monomer which is a vinyl ether in which at least one of the two vinylic (or double-bonded) carbon atoms thereof is bonded to at least one bromine or iodine atom. Such bromine- or iodine-containing cure site monomers, e.g., $CF_3CH_2OCF=CFBr$, thus provide in the backbone of the fluoropolymer along with the principal interpolymerized units, e.g., $—CH_2CF_2—$, $—CF_2CF(CF_3)—$, and $—CF_2CF_2—$, derived from the principal monomers, additional interpolymerized units, e.g., $—CF(OCH_2CF_3)CFBr—$, containing bromine or iodine atoms directly bonded to catenary (or backbone) carbon atoms as reactive sites for reaction with organic peroxide curing agents which are blended with the fluorocarbon elastomer gum. The fluoropolymer when heated with the peroxide (and optional co-curing agents such as triallylisocyanurate) provides catenary cure sites between which crosslinking is believed to be effected and a crosslinked or cured, insoluble, fluoropolymer results.

The cured fluorocarbon elastomers of this invention have useful properties normally associated with fluorocarbon elastomers, such as acid resistance, thermal stability, and high tensile strength. These properties, particularly the tensile strength of many of the cured fluorocarbon elastomers of this invention (e.g., those where vinylidene fluoride and hexafluoropropene are used as principal monomers), depending upon their particular composition and polymerization conditions used in their preparation, are not significantly or adversely affected upon exposure or shaped articles made therefrom to high temperatures for extended periods.

A broad class of the bromine- or iodine-containing vinyl ethers used as cure site monomers in accordance with this invention can be expressed by the formula $ROCX=CYZ$, where one or two of the X, Y and Z substituents are selected from bromine and iodine atoms, and the remainder of the substituents are independently hydrogen, fluorine, or (less preferably) chlorine atoms. Preferably, the halogen substituent(s) is either bromine or less preferably iodine and is bonded to the terminal carbon atom of the vinyl group, X thus being hydrogen, fluorine, or (less preferably) chlorine atoms. R in said formula is either a saturated or unsaturated, straight or branched chain or cyclic alkyl or alkenyl radical, an aryl radical, or combinations of such radicals, such as an alkaryl radical, which radicals do not interfere with the function of the vinyl ether as a cure site monomer. The hydrogen atoms of R may be replaced with chlorine or fluorine substituents, and R may contain catenary hetero-atom such as nitrogen or oxygen. R is preferably an aliphatic group, e.g., with 1 to about 6 carbon atoms, particularly an alkyl radical which is bonded to the ether oxygen atom through a methylene group.

A particularly useful class of the vinyl ether cure site monomers of this invention are the bromine-containing vinyl ethers of the formula $R'OCF=CFBr$, where R' is a lower alkyl or alkenyl group, having, for example, one or two carbon atoms, or an aryl radical such as phenyl. Particularly useful members of this class are $CF_3CH_2OCF=CFBr$, $C_2H_5OCF=CFBr$, $C_6H_5OCF=CFBr$, and $CH_3OCF=CFBr$.

The bromine- or iodine-containing vinyl ethers used in this invention may be prepared by known methods, for example, see Spears, L., Szur, A. J., and Terell, R. C., *Jour. of Medicinal Chemistry*, 15, pp. 606-608 (1972). The bromine-containing vinyl ethers may be prepared conveniently and in high yield by a two-step process. The first step is a base-catalyzed addition of a hydroxycontaining material of the formula ROH, where R is as defined above, to a bromine- or iodine-containing fluoroolefin of the formula $CR^1R^2=CR^3Br$ or $CR^1R^2=CR^3I$ where at least one of $R^1$, $R^2$, and $R^3$ is a fluorine atom and the remainder are independently hydrogen or halogen atoms. Representative bromine- and iodine-containing fluoroolefins useful as starting materials in the reaction include bromotrifluoroethylene, 1-bromo-2,2-difluoroethylene, 1,1-dibromodifluoroethylene, and iodotrifluoroethylene. Optionally, an aprotic solvent, such as N,N-dimethylformamide, may be used in this reaction; for examples, see U.S. Pat. No. 3,666,864 (Terrell); Demiel, A., J. of Organic Chemistry, 25, pp. 993–6, (1960); and Park, J. D., Cummings, H. L. and Locher, J. R., J. of Organic Chemistry, 23, pp. 1785–6 (1958). The second step consists of the treatment of the reaction product of the first step with a strong base such as potassium hydroxide to effect the elimination of hydrogen halide and yield the desired bromine- or iodine-containing vinyl ether (for related example, see Corley, R. S., Lal, J., and Kane, M. W., J. of American Chem. Soc., 78, pp. 3489–3493 (1956)). Examples of bromine-containing vinyl ethers which can be prepared by this method include $CH_3OCF=CFBr$ and $CF_3CH_2OCF=CFBr$. The overall reaction scheme using bromotrifluoroethylene as the fluoroolefin is:

Other methods of preparation include the following reaction sequence:

For preparation of $ROCH=CF_2$ see Wheaton, G. A. and Burton, D. J., J. of Organic Chemistry, 48, pp. 917–927 (1983).

The amount of the cure site monomers to be copolymerized with the main monomers or comonomers of the fluorocarbon elastomers of this invention will be, functionally speaking, an amount sufficient to provide cure sites or reactive sites so as to obtain the desired degree or state of cure when the resulting fluoropolymer gum containing such cure sites is compounded with the peroxide curing agent and the shaped article of the formulation is heated to effect cure or vulcanization. Generally, sufficient cure site monomer will be less than about 5 mole percent and preferably in the range of 0.1 to 1.5 mole percent, based on the total moles of the cure site monomer used and the principal monomers used to form the fluorocarbon elastomer gum. Those amounts of cure site monomer generally will provide at least about 0.05 weight percent bromine or iodine in the fluoropolymer.

Among the fluorocarbon elastomers which can be made or in a sense modified by incorporating a small amount of the bromine- or iodine-containing vinyl ether cure site monomers are the elastomeric copolymers of vinylidene fluoride with at least one terminally unsaturated comonomer containing at least one fluorine atom substituent on each vinylic or double-bonded carbon atom, each carbon atom of said comonomer being substituted only with fluorine, chlorine, hydrogen, lower fluoroalkyl radical, or lower fluoroalkoxy radical, particularly hexafluoropropene, tetrafluoroethylene, chlorotrifluoroethylene, perfluoromethyl perfluorovinyl ether, and 1-hydropentafluoropropene. Tetrafluoroethylene may also be copolymerized with the cure site monomer and olefinic hydrocarbon compounds such as ethylene or propylene and optionally also vinylidene fluoride. Another class of fluorocarbon elastomers of this invention are those made by copolymerizing the cure site monomers with tetrafluoroethylene and a perfluoroalkyl perfluorovinyl ether such as perfluoromethyl perfluorovinyl ether. Particular fluorinated elastomers which can be modified by incorporating the vinyl ether cure site monomer are those produced by copolymerizing vinylidene fluoride with a fluorine-containing olefin and optionally perfluoroalkyl perfluorovinyl ether, such as the vinylidene fluoride/hexafluoropropene copolymer described in U.S. Pat. Nos. 3,051,677 (Rexford) and 3,318,854 (Honn et al). Other fluorocarbon elastomers that can be modified are those copolymers produced by copolymerizing vinylidene fluoride, hexafluoropropene, and tetrafluoroethylene as described in U.S. Pat. No. 2,968,649 (Pailthorp et al), and those copolymers produced by copolymerizing tetrafluoroethylene with propylene as described in U.S. Pat. No. 4,277,586 (Ukihashi et al).

In one preferred embodiment, the fluorocarbon elastomers of this invention are copolymers whose interpolymerized units comprise, consist, or consist essentially of 50 to 85 mole percent of units derived from vinylidene fluoride, 10 to 50 mole percent of units derived from hexafluoropropylene, 0 to 30 mole percent of units derived from other highly fluorinated monomers, such as tetrafluoroethylene, and 0.15 to 1.5 mole percent of units derived from said bromine-containing or iodine-containing vinyl ether cure site monomers. Another embodiment is a copolymer with 35 to 70 mole percent of units derived from tetrafluoroethylene, 30 to 65 mole percent of units derived from propene or butene, and 0.15 to 1.5 mole percent of units derived from the cure site monomer.

The fluoropolymers of this invention can be prepared by known high pressure, free-radical polymerization techniques generally used to prepare fluorocarbon elastomers such as vinylidene fluoride/hexafluoropropene polymers, for example, those techniques described by West and Holcomb, supra, and in said U.S. Pat. No. 4,035,565. Briefly, the fluoropolymers are prepared by charging a pressure reactor with reaction diluent, pH buffer, emulsifier, initiator, and the cure site monomer and principal comonomers; carrying out the emulsion polymerization of the charge at constant elevated temperature, e.g. 35° to 125° C., and pressure, e.g. 0.5 to 10 MPa, with agitation; coagulating the resulting latex; and filtering, washing, and drying the resulting fluorocarbon elastomer gum.

Though any of the conventional "free-radical" generating cure initiators can be used in the vulcanization or curing of the fluoropolymer gum of this invention, such as actinic radiation, electron beam, and organic or inorganic peroxides, organic peroxides are preferred. Suitable peroxides include benzoyl peroxide, bis(2,4 dichlorobenzoyl)peroxide, dicumyl peroxide, t-butylhydroperoxide, di-t-butyl peroxide, t-butylperoxy benzoate, and lauroyl peroxide. Particularly useful commercially available peroxides are 2,5-dimethyl-2,5-bis(t-butylperoxy)hexane and 2,5-dimethyl-2,5-bis(t-butylperoxy)hexyne-3 which are the active ingredients of products sold as "Luperco" 101XL and 130XL, respectively. The amount of peroxide curing agent to be mixed with the fluorocarbon elastomer gum, e.g. on a two-roll mill, in a Banbury mixer, or in a mixing extruder, generally will be 0.1 to 10, preferably 1 to 5, parts per 100 parts of the fluoropolymer gum.

Along with the peroxide curing agent it will generally be desirable to incorporate in or compound with the gum a cocuring agent (or coagent), such as are commonly used in peroxide vulcanization of fluorocarbon elastomers to obtain a tighter or faster cure or better compression set. Such cocuring agents generally will be used in amounts of 0.1 to 10, preferably 1 to 5, parts per 100 parts of the fluoropolymer gum. Cocuring agents which can be used include triallylcyanurate, diallylphthalate, allylmethacrylate and, particularly, triallylisocyanurate.

In many cases, for optimum vulcanizate physical properties, such as tensile strength, it will be desirable to include in the compounding formulation a reinforcing filler such as carbon black, silica, iron oxide, or zinc oxide, e.g. 5 to 60 parts by weight per 100 parts by weight of the fluoropolymer gum. Acid acceptors, such as magnesium oxide and calcium hydroxide, pigments, plasticizers, and processing aids which are compatible with the gum can be mixed therewith.

For some applications it may be desirable to blend or combine the fluorocarbon elastomer gum (containing the bromine or iodine cure sites derived from the vinyl ether cure site monomers) with other peroxide-curable elastomers, such as fluorosilicone gums (as described in said U.S. Pat. No. 4,263,414). The fluorocarbon elastomer gum can be first banded on a two-roll mill and then the other gums, if any, blended in until uniform, or the gums can be banded together, and the balance of compounding adjuvants can then be milled in as a mixture.

In making the shaped articles, generally the compounded, vulcanizable mixture or fluorocarbon elastomer gumstock is extruded or molded in a cavity or transfer mold at a temperature in the range of 125° to 250° C. for 1 to 50 minutes or more at about 5 to 10 MPa. The extruded or press-cured article is then transferred to a circulating air oven and post-cured at about 170° to 260° C. for about 2 to 24 hours, preferably at about 230° C. for 16 hours, yielding cured (that is, cross-linked or vulcanized) shaped articles which are elastomeric (i.e., materials which, when slowly stretched at room temperature to at least twice their original length and released, return rapidly to essentially their original length).

The curable fluorocarbon elastomer compositions of this invention can be employed in making molded or extruded articles of manufacture, such as gaskets, O-rings, diaphragms, tubing, ducting, carburetor fuel tips, fuel pump cups, shaft seals, and other molded goods. The particular application will usually be determined by the properties of the cured polymer, the requirements of such applications being well known and described, for example, in the prior art publications described hereinbefore.

Objects and advantages of this invention are illustrated in the following examples. Cure characteristics of compounded gum were measured according to ASTM-D2084-75 with an oscillating disc rheometer and reported as "ODR". The press-cured sheets, 150 mm33 150 mm×2 mm sheets, and O-rings, 15 mm diameter, 3.5 mm thick, were pressed at about 7 MPa for 15 minutes at 177° C. The post-cured sheets were those removed from the press and placed for 16 hours in a circulating air oven having a temperature maintained at 232° C. The accelerated aging was carried out according to ASTM D 573-78, the samples being exposed for the indicated time at the indicated temperature. Compression set was determined in accordance with ASTM D 395-78 (Method B) using 15 mm diameter O-rings 3.5 mm thick compressed to 2.6 mm under the indicated conditions. Tensile strength, elongation at break, and modulus at 100 percent elongation were measured in accordance with ASTM D 412-80, using Die D. Hardness was measured in accordance with ASTM D 2240-75, using Durometer A and taking readings 2 seconds after the presser foot came into contact with the specimen.

EXAMPLE 1

To a 500 ml 3-neck, magnetically stirred flask, fitted with a thermometer, water-cooled condenser, and a gas dispersion tube, was added 150 ml N,N-dimethylformamide, 119 g (1.19 mole) 2,2,2-trifluoroethanol, and 4.5 g (0.11 mole) sodium hydroxide and the system was purged with nitrogen. The system was then placed under a slight positive nitrogen pressure and bromotrifluoroethylene (192 g, 1.19 mole) was slowly added via the gas dispersion tube over a period of one hour while the stirred flask was cooled with an ice/water bath to maintain a temperature of 35°–40° C. in the flask. After the reaction was complete, the reaction mixture was poured into 500 ml water. The lower layer was separated and washed twice with 500 ml water. The crude product was distilled using a 40 cm Vigreux column. The fraction distilling at 93°–94° C., weighing 255 g, was collected and identified as $CF_3CH_2OCF_2CFBrH$ by H- and F-NMR analyses. Purity was found to be 99.9% by gas-liquid chromatography.

A 500 ml magnetically stirred 3-neck flask was fitted with a thermometer, addition funnel, and a distillation head attached to a water-cooled condenser connected to a receiving flask cooled with an ice/water bath. Solid 85% potassium hydroxide (549 g) was added to the flask and the system was purged with nitrogen. The reaction flask was then heated to fuse the KOH and the temperature was maintained at 140° C. with stirring. A slow nitrogen flow was maintained through the system while the above-prepared $CF_3CH_2OCF_2CFBrH$ (255 g, 0.98 mole) was slowly added over a 3-hour period. During this time, 222 g of a clear, colorless liquid was collected in the receiving flask. This material was analyzed by H- and F-NMR and found to correspond to "Composition A" in Table 1.

By a procedure similar to that of the above paragraph, similarly prepared $CF_3CH_2OCF_2CFBrH$ (69 g, 0.26 mole) and 206 g of "Composition A" were reacted with 677 g of 85% KOH at 155°–170° C. to give 245 g of material designated as "Composition B" in Table 1.

TABLE 1

| Compound | Composition (mole %) | |
|---|---|---|
| | "A" | "B" |
| $CF_3CH_2OCF=CFBr$ | 71.4 | 79.3 |
| $CF_2=CHOCF=CFBr$ | 3.1 | 8.3 |
| $CF_3CH_2OCF_2CFBrH$ | 25.5 | 12.4 |

EXAMPLE 2

$CH_3OCF_2CFBrH$ was prepared as described in U.S. Pat. No. 3,666,864 (Terrell). By a procedure similar to that described in Example 1, 351 g of $CH_3OCF_2CFBrH$ (1.82 mole) was reacted with 649 g of 85% KOH at 175° C. to give 277 g of a material designated "Composition C" in Table 2.

By a procedure similar to that described in Example 1, 269 g of "Composition C" was reacted with 700 g of 85% KOH at 200° C. to give 231 g of a material designated "Composition D" in Table 2.

By a procedure similar to that described in Example 1, 1345 g $CH_3OCF_2CFBrH$ was reacted with 2290 g of 91% KOH at 170° C. to give 1030 g of a clear, colorless liquid. This reaction was repeated three times on a similar scale and the reaction products of the four runs were combined. The combined product mixture was distilled using a 40 cm Vigreux column and 3907 g of a fraction having a boiling range of 69°–84° C. was collected and is designated "E" in Table 2.

TABLE 2

| Compound | Composition (mole %) | | |
|---|---|---|---|
| | "C" | "D" | "E" |
| $CH_3OCF=CFBr$ | 55.9 | 85.7 | 82.4 |
| $CH_3OCF_2CFBRH$ | 44.1 | 14.3 | 17.6 |

EXAMPLE 3

Two fluoroelastomers of the present invention were prepared by the following general procedure, with specific charges and reaction conditions being listed in Table 3.

A stirred reactor was charged and the reaction mixture was polymerized under pressure at elevated temperature and with agitation. A portion of the resulting latex was coagulated by adding dropwise to a stirred aqueous solution containing $MgCl_2$ and 1-butanol, with a typical coagulation recipe as follows:

| | Parts by weight |
|---|---|
| latex | 2500 |
| magnesium chloride | 12 |
| 1-butanol | 25 |
| deionized water | 830 |

After coagulation was complete, the raw gum was washed 5 times with hot deionized water (about 60° C.). Excess water was removed and the raw gum was dried overnight at about 105° C.

The raw gum was compounded on a two-roll water-cooled mill by adding a mixture of the compounding ingredients to the banded fluorocarbon elastomer gum. The compounding recipe was as follows:

| | Parts by weight |
|---|---|
| fluoroelastomer gum | 100 |
| medium thermal carbon black (N-990) | 30 |
| calcium hydroxide | 3 |
| "Luperco" 101XL* | 2.5 |
| triallylisocyanurate | 2.5 |

*45% 2,5-dimethyl-2,5-bis(t-butylperoxy)hexane on an inert filler

Press cured sheets and O-rings were prepared and post-cured. Their properties are listed in Table 4.

TABLE 3

Fluoroelastomer Preparation

| | Runs | |
|---|---|---|
| | 1 | 2 |
| Cure site monomer composition | "B" | "D" |
| Monomer blend, wt. % | | |
| vinylidene fluoride | 59.87 | 59.86 |
| hexafluoropropene | 39.41 | 39.31 |
| cure site monomer | 0.72 | 0.83 |
| Charge, parts by weight | | |
| deionized water | 3000 | 3000 |
| $K_2HPO_4$ | 12.6 | 13.1 |
| $K_2S_2O_8$ | 2.64 | 7.0 |
| $C_8F_{17}SO_2N(C_2H_5)CH_2CO_2K$ | 0 | 0.6 |
| $C_7F_{15}CO_2H$ | 12.6 | 0 |
| hexafluoropropene precharge | 25 | 25 |
| monomer blend | 1150 | 1150 |
| Reactor stirrer speed, rpm | 750 | 750 |
| Reaction temperature, °C. | 68 | 68 |
| Reaction pressure, MPa | 1.3 | 1.3 |
| Reaction time, hours | 22 | 14 |
| Mooney viscosity, ML 1 + 10 @ 121° C. | 93 | 53 |
| Gum analysis, wt. % | | |
| C | 31.6 | 31.1 |
| H | 1.7 | 1.7 |
| Br | 0.22 | 0.26 |
| Gum composition, mole % | | |
| vinylidene fluoride | 75.37 | 72.37 |
| hexafluoropropene | 24.39 | 27.35 |
| cure site monomer | 0.24 | 0.28 |

TABLE 4

Cure and Physical Properties of Compounded Fluoroelastomer

| | Runs | |
|---|---|---|
| | 1 | 2 |
| ODR, 3° arc. 100 cpm, 177° C. | | |
| minimum torque, N · m | 2.5 | 1.4 |
| time to 0.1 N · m rise, min. | 3.5 | 2.8 |
| time to 3.4 N · m torque, min. | 3.9 | 4.4 |
| time to 5.7 N · m torque, min. | 7.0 | 7.7 |
| maximum torque at 12 min., N · m | 6.6 | 6.1 |
| Press cure properties | | |
| tensile strength, MPa | 9.2 | 10.7 |
| elongation at break, % | 385 | 307 |
| 100% Modulus, MPa | 2.2 | 2.5 |
| hardness, Shore A | 63 | 65 |
| Post cure properties | | |
| tensile strength, MPa | 13.4 | 15.6 |
| elongation at break, % | 272 | 166 |
| 100% Modulus, MPa | 3.0 | 3.3 |
| hardness, Shore A | 66 | 67 |
| Heat aged properties, 70 hours @ 275° C. | | |
| tensile strength, MPa | 7.3 | 7.2 |
| elongation at break, % | 290 | 236 |
| 100% Modulus, MPa | 2.1 | 2.5 |
| hardness, Shore A | 63 | 66 |
| Compression set, | | |
| 70 hrs. @ 200° C., % | 41 | 36 |

As the data of Tables 3 and 4 show, the cured fluorocarbon elastomers of this invention had useful press cure and post cure properties. Those properties were retained after heat aging, making such fluoropolymers useful in applications where the effects of elevated temperatures are important, e.g., O-ring applications. In a comparison run, using $CF_2=CFOCF_2CF_2Br$ as a cure site monomer, though useful press cure and post cure properties were obtained, they were not retained well after heat aging.

EXAMPLE 4

Another fluorocarbon elastomer, particularly useful in such applications as shaft seals, of this invention was prepared, compounded, and tested, using the procedure of Example 3 but employing different principal monomers. This work is summarized in Tables 5 and 6.

TABLE 5

| Fluoroelastomer Preparation | |
|---|---|
| Cure site monomer composition | "E" |
| Monomer blend, wt. % | |
| vinylidene fluoride | 32.68 |
| hexafluoropropene | 43.00 |
| tetrafluoroethylene | 23.65 |
| cure site monomer | 0.67 |
| Charge, parts by weight | |
| deionized water | 3410 |
| K$_2$HPO$_4$ | 14.2 |
| K$_2$S$_2$O$_8$ | 7.5 |
| C$_8$F$_{17}$SO$_2$N(C$_2$H$_5$)CH$_2$CO$_2$K | 3 |
| hexafluoropropene precharge | 18 |
| monomer blend | 1340 |
| Reactor stirrer speed, rpm | 150 |
| Reaction temperature, °C. | 71 |
| Reaction pressure, MPa | 1.0 |
| Reaction time, hours | 8.5 |
| Mooney viscosity, ML 1 + 10 @ 121° C. | 75 |
| Gum analysis, wt. % | |
| C | 28.5 |
| H | 0.9 |
| Br | 0.23 |
| Gum Composition, mole % | |
| vinylidene fluoride | 49.98 |
| hexafluoropropene | 26.84 |
| tetrafluoroethylene | 22.90 |
| cure site monomer | 0.28 |

TABLE 6

| Cure and Physical Properties of Compounded Fluoroelastomer | |
|---|---|
| ODR, 3° arc. 100 cpm, 17° C. | |
| minimum torque, N · m | 2.5 |
| time to 0.1 N · m rise, min. | 3.3 |
| time to 3.4 N · m torque, min. | 4.2 |
| time to 5.6 N · m torque, min. | 10.0 |
| maximum torque at 12 min., N · m | 5.8 |
| Press cure properties | |
| tensile strength, MPa | 7.4 |
| elongation at break, % | 357 |
| 100% Modulus, MPa | 2.4 |
| hardness, Shore A | 66 |
| Post cure properties | |
| tensile strength, MPa | 13.0 |
| elongation at break, % | 354 |
| 100% Modulus, MPa | 2.8 |
| hardness, Shore A | 69 |

Various modifications and alterations of this invention will become apparent to those skilled in the art without departing from the scope and spirit of this invention.

I claim:

1. Fluorocarbon elastomer gum having interpolymerized units derived from principal comonomers and a vinyl ether cure site monomer of the formula ROCX=CYZ where one or two of X, Y, and Z substituents are selected from bromine and iodine atoms and the remainder of the substituents are independently selected from hydrogen, fluorine, or chlorine atoms, and where R is a straight or branched chain or cyclic alkyl or alkenyl radical, aryl radical, or combinations of such radicals, the hydrogen atoms of R may be substituted with chlorine or fluorine and R may contain catenary nitrogen or oxygen atoms, said principal comonomers being vinylidene fluoride with at least one terminally unsaturated comonomer containing at least one fluorine atom substituent on each vinylic or double-bonded carbon atom, each carbon atom of said comonomer being substituted only with fluorine, chlorine, hydrogen, lower fluoroalkyl radical, or lower fluoroalkoxy radical.

2. Fluorocarbon elastomer gum which comprises a copolymer whose interpolymerized units are derived from principal comonomer and from a vinyl ether cure site monomer of the formula ROCX=CYZ where one or two of X, Y, and Z substituents are selected from bromine and iodine atoms and the remainder of the substituents are independently selected from hydrogen, fluorine, or chlorine atoms, and where R is a, straight or branched chain or cyclic alkyl or alkenyl radical, aryl radical, or combinations of such radicals, the hydrogen atoms of R may be substituted with chlorine or fluorine and R may contain catenary nitrogen or oxygen atoms, said principal comonomers being (a) vinylidene fluoride, at least one fluorine-containing olefin, and optionally perfluoroalkyl perfluorovinyl ether, (b) tetrafluoroethylene, olefinic hydrocarbon, and optionally vinylidene fluoride, or (c) tetrafluoroethylene and perfluoroalkyl perfluorovinyl ether.

3. Fluorocarbon elastomer gum according to claim 1 where said vinyl ether cure site monomer has the formula ROCX=CYZ where one or two of Y and Z substituents are either bromine or iodine atoms and the remainder of the substituents and X are hydrogen or fluorine atoms, and R is an aliphatic group bonded to the ether oxygen atom through a methylene group.

4. Fluorocarbon elastomer gum according to claim 1 where said vinyl ether comonomer has the formula R'—O—CF=CFBr where R' is a lower alkyl or alkenyl group which can be fluorinated or is an aryl radical.

5. Fluorocarbon elastomer gum according to claim 4 wherein said cure site monomer is CF$_3$CH$_2$—O—CF=CFBr.

6. Fluorocarbon elastomer gum according to claim 4 wherein said cure site monomer is CF$_2$=CH—O—CF=CFBr.

7. Fluorocarbon elastomer gum according to claim 4 wherein said cure site monomer is CH$_3$—O—CF=CFBr.

8. Fluorocarbon elastomer gum according to claim 4 wherein said principal comonomers are vinylidene fluoride, hexafluoropropene, and optionally, tetrafluoroethylene.

9. Fluorocarbon elastomer gum according to claim 4 wherein said interpolymerized units are derived from 0.15 to 1.5 mole percent of said cure site monomer based on the total moles of said cure site monomer and said principal comonomers.

10. Process for preparing the fluorocarbon gum of claim 1 which comprises subjecting said cure site monomers and principal monomers to free radical aqueous emulsion polymerization at elevated temperature and pressure and with agitation, coagulating the resulting latex, and filtering, washing, and drying the resulting fluorocarbon elastomer gum.

11. Fluorocarbon elastomer gum according to claim 1 wherein the amount of said cure site monomer used in preparing said gum is sufficient to provide cure sites so as to obtain the desired degree of cure when said gum is vulcanized with peroxide curing agent.

12. Fluoropolymer elastomer gum according to claim 1 wherein the amount of said cure site monomer is less than about 5 mole percent based on the total moles of monomers used to form said gum and sufficient to provide at least about 0.05 weight percent bromine or iodine in said gum.

13. Fluoropolymer elastomer gum according to claim 1 wherein the amount of said cure site monomer is 0.1 to 1.5 mole percent based on the total moles of monomers used to form said gum and sufficient to provide at least about 0.05 weight percent bromine or iodine in said gum.

14. Fluoropolymer elastomer gum according to claim 1 wherein one or two of X, Y, and Z substituents is bromine and the remainder of the substituents are hydrogen or fluorine.

15. Fluoropolymer elastomer gum according to claim 1 wherein X and Y are fluorine and Z is bromine.

16. Fluorocarbon elastomer gum having interpolymerized units derived from 50 to 85 mole percent of vinylidene fluoride, 10 to 50 mole percent of hexafluoropropylene, 0 to 30 mole percent of tetrafluoroethylene, and 0.15 to 1.5 mole percent of a vinyl ether cure site monomer of the formula $CF_3CH_2-O-CF=CFBr$, said gum having at least 0.05 weight percent bromine.

17. Fluoropolymer elastomer gum having interpolymerized units derived from 35 to 70 mole percent of tetrafluoroethylene, 30 to 65 mole percent of propene or butene, and 0.15 to 1.5 mole percent of $CF_3CH_2-O-CF=CFBr$.

* * * * *

UNITED STATES PATENT AND TRADEMARK OFFICE
CERTIFICATE OF CORRECTION

PATENT NO. : 4,564,662

DATED : January 14, 1986

INVENTOR(S) : Loren D. Albin

It is certified that error appears in the above-identified patent and that said Letters Patent is hereby corrected as shown below:

Col. 1, line 4, "elastomrs" should read -- elastomers -- .

Col. 2, line 29, "or" should read -- of -- .

Col. 2, line 49, "hetero-atom" should read -- hetero-atoms -- .

Col. 5, line 65, "mm33" should read -- mm x -- .

Col. 7, line 25, "$CH_3OCF_2CFBRH$" should read -- $CH_3OCF_2CFBrH$ -- .

Col. 9, line 38, "$17°C.$" should read -- $177°C.$ -- .

Col. 10, line 16, "a, straight" should read -- a straight -- .

Signed and Sealed this

Eighth Day of July 1986

[SEAL]

Attest:

DONALD J. QUIGG

Attesting Officer

Commissioner of Patents and Trademarks